(12) United States Patent
Girgensohn et al.

(10) Patent No.: US 9,671,939 B2
(45) Date of Patent: Jun. 6, 2017

(54) SYSTEMS AND METHODS FOR AUTOMATIC GENERATION AND CONSUMPTION OF HYPERMEETINGS

(71) Applicant: FUJI XEROX CO., LTD., Tokyo (JP)

(72) Inventors: Andreas Girgensohn, Palo Alto, CA (US); Frank M. Shipman, III, College Station, TX (US); Lynn Donelle Wilcox, Redwood City, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 97 days.

(21) Appl. No.: 14/574,386

(22) Filed: Dec. 17, 2014

(65) Prior Publication Data
US 2016/0182851 A1 Jun. 23, 2016

(51) Int. Cl.
*H04N 5/91* (2006.01)
*G06F 3/0484* (2013.01)
*G06Q 10/10* (2012.01)
*H04N 5/765* (2006.01)
*H04N 9/82* (2006.01)

(52) U.S. Cl.
CPC ..... *G06F 3/04842* (2013.01); *G06Q 10/1095* (2013.01); *H04N 5/765* (2013.01); *H04N 5/91* (2013.01); *H04N 9/8205* (2013.01)

(58) Field of Classification Search
None
See application file for complete search history.

(56) References Cited

U.S. PATENT DOCUMENTS

| | | | |
|---|---|---|---|
| 8,635,293 B2 | 1/2014 | Fisher | |
| 2013/0325972 A1* | 12/2013 | Boston | G06K 9/00751 709/206 |
| 2013/0339431 A1* | 12/2013 | Yannakopoulos | H04L 12/1827 709/204 |
| 2014/0161244 A1* | 6/2014 | Jones | H04M 3/56 379/202.01 |

(Continued)

OTHER PUBLICATIONS

J Barksdale et al. Video threads: asyncnronous video snaring for temporally distributed teams. In Proc. ACM 2012 Conf. on Computer Supported Cooperative Work, ACM NY 1101-1104.

(Continued)

*Primary Examiner* — Eileen Adams
(74) *Attorney, Agent, or Firm* — TransPacific Law Group; Pavel I. Pogodin, Esq.

(57) ABSTRACT

Provided a computer-implemented method for a meeting playback, the method being performed in connection with a computerized system incorporating a central processing unit, a display device and a memory, the computer-implemented method involving: generating a first user interface portion on the display device, the first user interface portion for displaying a first meeting; generating a second user interface portion on the display device, the second user interface portion for displaying a second meeting, wherein the first meeting is prior to the second meeting and wherein the first meeting and second meeting are linked together using at least one link; performing a playback of the second meeting in the second user interface portion; and during the playback of the second meeting, using the at least one link to perform a playback of at least a portion of the first meeting.

23 Claims, 8 Drawing Sheets

(56) References Cited

U.S. PATENT DOCUMENTS

2016/0057390 A1* 2/2016 Ramalho ............... H04N 7/155
                                                          348/14.08

OTHER PUBLICATIONS

W Geyer et al. Towards a Smarter Meeting Record—Capture and Access of Meetings Revisited. Multimedia Tools Appl. 27, 3 (Dec. 2005), 393-410.

T Moran et al. I'll get that off the audio: a case study of salvaging multimedia meeting records. In Proc. CHI '97 Conf. ACM, New York, NY, USA, 202-209.

F Shipman et al. Authoring, viewing, and generating hypervideo: An overview of Hyper-Hitchcock. ACM Trans. Multimedia Comput. Commun. Appl. 5, 2, Article 15 (Nov. 2008).

J Tang et al. Time travel proxy: using ligntweight video recordings to create asynchronous, interactive meetings. In Proc. CHI '12 Conf. ACM, New York, NY, USA, 3111-3120.

* cited by examiner

Participant Table:
Shows who took part in each meeting/part

Used for speaker segmentation

220

Topic Table:
List of topics used to index content

Table could include information to facilitate topic detection

221

Link Table:
List of links between contents
Each link describes both anchors (start and end time) and a link label

SYSTEMS AND METHODS FOR AUTOMATIC GENERATION AND CONSUMPTION OF HYPERMEETINGS

BACKGROUND OF THE INVENTION

Technical Field

The disclosed embodiments relate in general to techniques for automating meeting capture and playback and, more specifically, to systems and methods for automatic generation and consumption of hypermeetings.

Description of the Related Art

Meetings are an important part of collaborative activities but are difficult to schedule, particularly when a set of collaborators is spread across multiple locations and time zones. Additionally, meetings often overlap in terms of content. This can cause difficulties as meetings that build on what was discussed in prior meetings result in barriers for those not at prior meetings and meetings that re-discuss topics are often viewed as unproductive by the participants that were at prior meetings.

Meetings with asynchronous participation are desired but currently not well supported. Systems either treat the original meeting as a series of independent discussions, losing their interconnections, or they record everything putting the onus of locating and responding to discussion on participants.

As would be appreciated by those of skill in the art, in view of the aforesaid deficiencies of the conventional technology, new and improved systems and methods are needed for enabling meetings across locations and time zones and providing access to meetings based on the inherent relations between meeting content.

SUMMARY OF THE INVENTION

The embodiments described herein are directed to methods and systems that substantially obviate one or more of the above and other problems associated with conventional meeting automation techniques.

In accordance with one aspect of the inventive concepts described herein, there is provided a computer-implemented method for a meeting playback, the method being performed in connection with a computerized system incorporating a central processing unit, a display device and a memory, the computer-implemented method involving: generating a first user interface portion on the display device for displaying a first meeting; generating a second user interface portion on the display device, the second user interface portion for displaying a second meeting, wherein the first meeting is prior to the second meeting and wherein the first meeting and second meeting are linked together using at least one link; performing a playback of the second meeting in the second user interface portion; and during the playback of the second meeting, using the at least one link to perform a playback of at least a portion of the first meeting.

In one or more embodiments, the first meeting and the second meeting each include a plurality of audiovisual streams and wherein performing the playback of the first meeting or the second meeting comprises performing the playback of a corresponding audiovisual stream of the plurality of audiovisual streams.

In one or more embodiments, the method further involves performing a playback of the first meeting in the first user interface and, during the playback of the first meeting, using the at least one link to perform a playback of at least a portion of the second meeting.

In one or more embodiments, at least one link is automatically followed.

In one or more embodiments, the first user interface portion includes a first timeline and the second user interface portion includes a second timeline and wherein the at least one link is indicated on the first timeline and on the second timeline.

In one or more embodiments, the first user interface portion includes a first timeline and wherein an identity of at least one speaker associated with the first meeting is indicated on the first timeline.

In one or more embodiments, the identity of the at least one speaker associated with the first meeting is indicated on the first timeline using a color-coding.

In one or more embodiments, the second user interface portion includes a second timeline and wherein an identity of at least one speaker associated with the second meeting is indicated on the second timeline.

In one or more embodiments, the first user interface portion includes a first timeline and wherein at least one topic associated with the first meeting is indicated on the first timeline.

In one or more embodiments, the method further involves generating a third user interface portion on the display device, the third user interface portion displaying at least one topic associated with the first meeting.

In one or more embodiments, the method further involves receiving a command associated with the playback of the second meeting and propagating the received command to a second computerized system performing a playback of the second meeting such that the playback of the second meeting on the computerized system and the second computerized system are synchronized.

In one or more embodiments, the received command is a playback pause command.

In one or more embodiments, at least one link includes a start time, an end time and a link label.

In one or more embodiments, the method further involves, upon a receipt of a command, automatically creating a second link between the second meeting and the first meeting.

In one or more embodiments, the command is a pause command.

In accordance with another aspect of the inventive concepts described herein, there is provided a computer-implemented method for capturing a first meeting and a second meeting, the method being performed in connection with a computerized system incorporating a central processing unit, a camera, an audio capture device and a memory, the computer-implemented method involving: capturing at least one first media stream corresponding to the first meeting involving at least one first participant; capturing at least one second media stream corresponding to the second meeting involving at least one second participant; performing a playback of the captured at least one second media stream; and during the playback of the second media stream, performing a playback of at least a portion of the first media stream.

In one or more embodiments, the playback of at least a portion of the first media stream is performed using a link between the second meeting and the first meeting.

In one or more embodiments, the method further involves, upon a receipt of a command, automatically creating the link between the second meeting and the first meeting.

In one or more embodiments, the command is a pause command.

In one or more embodiments, the method further involves performing a speaker segmentation within the captured first media stream and the second media stream.

In one or more embodiments, the method further involves performing topic assignment within the captured first media stream and the second media stream.

In one or more embodiments, the method further involves capturing a third media stream corresponding to a third meeting involving the playback of at least the second media stream.

In accordance with yet another aspect of the inventive concepts described herein, there is provided a non-transitory computer-readable medium embodying a set of computer-executable instructions, which, when executed in a computerized system incorporating a central processing unit, a display device and a memory, cause the computerized system to perform a method for a meeting playback, the method involving: generating a first user interface portion on the display device for displaying a first meeting; generating a second user interface portion on the display device, the second user interface portion for displaying a second meeting, wherein the first meeting is prior to the second meeting and wherein the first meeting and second meeting are linked together using at least one link; performing a playback of the second meeting in the second user interface portion; and during the playback of the second meeting, using the at least one link to perform a playback of at least a portion of the first meeting.

In one or more embodiments, the first meeting and the second meeting each include a plurality of audiovisual streams and wherein performing the playback of the first meeting or the second meeting comprises performing the playback of a corresponding audiovisual stream of the plurality of audiovisual streams.

In one or more embodiments, the method further involves performing a playback of the first meeting in the first user interface and, during the playback of the first meeting, using the at least one link to perform a playback of at least a portion of the second meeting.

In one or more embodiments, at least one link is automatically followed.

In one or more embodiments, the first user interface portion includes a first timeline and the second user interface portion includes a second timeline and wherein the at least one link is indicated on the first timeline and on the second timeline.

In one or more embodiments, the first user interface portion includes a first timeline and wherein an identity of at least one speaker associated with the first meeting is indicated on the first timeline.

In one or more embodiments, the identity of the at least one speaker associated with the first meeting is indicated on the first timeline using a color-coding.

In one or more embodiments, the second user interface portion includes a second timeline and wherein an identity of at least one speaker associated with the second meeting is indicated on the second timeline.

In one or more embodiments, the first user interface portion includes a first timeline and wherein at least one topic associated with the first meeting is indicated on the first timeline.

In one or more embodiments, the method further involves generating a third user interface portion on the display device, the third user interface portion displaying at least one topic associated with the first meeting.

In one or more embodiments, the method further involves receiving a command associated with the playback of the second meeting and propagating the received command to a second computerized system performing a playback of the second meeting such that the playback of the second meeting on the computerized system and the second computerized system are synchronized.

In one or more embodiments, the received command is a playback pause command.

In one or more embodiments, at least one link includes a start time, an end time and a link label.

In one or more embodiments, the method further involves, upon a receipt of a command, automatically creating a second link between the second meeting and the first meeting.

In one or more embodiments, the command is a pause command.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive concepts. Specifically:

FIGS. 2(a) and 2(b) illustrates exemplary embodiments of data structures and tables for representing hypermeetings.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

To address the above and other problems associated with the conventional technology, one or more embodiments described herein implement approach to automatic generation and consumption of meetings. The approach described herein, which is also referred to herein as hypermeeting, retains the original temporal structure of the meeting yet supports navigation among the asynchronous elements of a meeting. The combination of structuring the record of the meeting and the interface making use of that structure reduces difficulty in identifying relations and moving among recordings.

Figure 1:
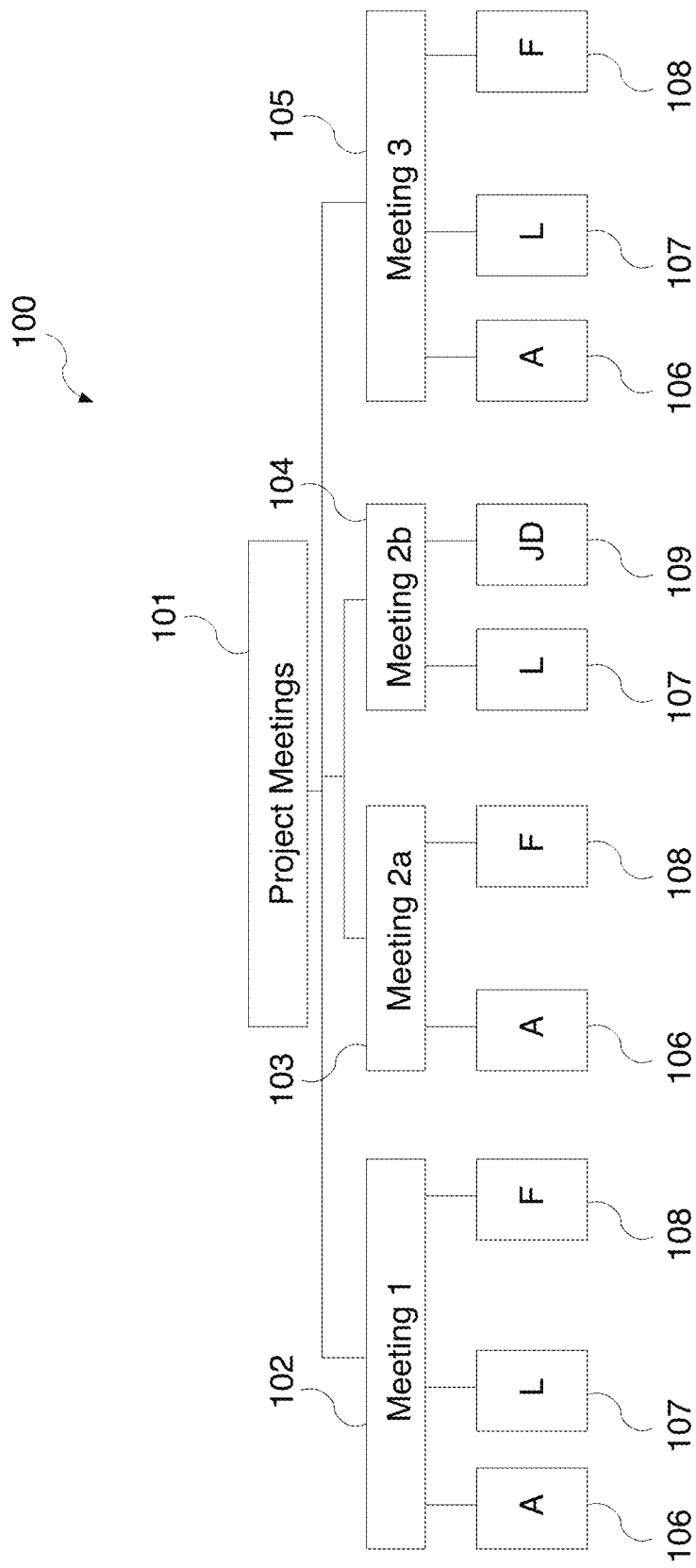
FIG. 1 illustrates an example of a meeting structure being addressed by one or more embodiments described herein.

FIG. 1 illustrates an example 100 of the situation being addressed by one or more embodiments described herein, although many other contexts are also applicable in connection with the described embodiments. Consider the case where periodic project meetings 101 occur for a project involving a distributed team, Andreas 106 and Lynn 107 in Palo Alto and Frank 108 in College Station. As such, remote meeting software is required but as the members of the team have other projects/responsibilities as well they are not always available for every scheduled meeting. Additional team members at both sites are involved in the meetings periodically and sometimes in-person meetings about the project occur at one site without coordinating with the other site.

As shown in FIG. 1, a kickoff meeting (Meeting 1, designated by numeral 102 in FIG. 1) occurs with Andreas 106, Lynn 107, and Frank 108 each recorded in their own video (although Lynn and Andreas could have an in-person meeting). The next week, Lynn 107 is not available at the normal meeting time but Andreas 106 and Frank 108 meet to discuss progress and look back at the recordings from the prior week's meetings to make sure they remember Lynn's perspective on some of the design issues (Meeting 2a, 103 in FIG. 1). As meetings participants replay and comment on the prior recordings, links are automatically generated between the original and later meeting and, sometimes, Andreas and Frank attach labels to the links to indicate what was the topic of the discussion. Later, Lynn meets with JD 109 to further discuss the project (Meeting 2b, 104 in FIG. 1). Their meeting is initially a set of reactions/responses to Meeting 2a in which they use the links generated during meeting 2a while also generating new hyperlinks, but move on to other topics as well. In week 3, the regularly scheduled distributed meeting (Meeting 3, 105 in FIG. 1) takes place using the recordings and links from Meetings 1, 2a, and 2b as questions arise and generating more links that enable tracing the discussion of topics across meetings in future project meetings.

Figure 2A:
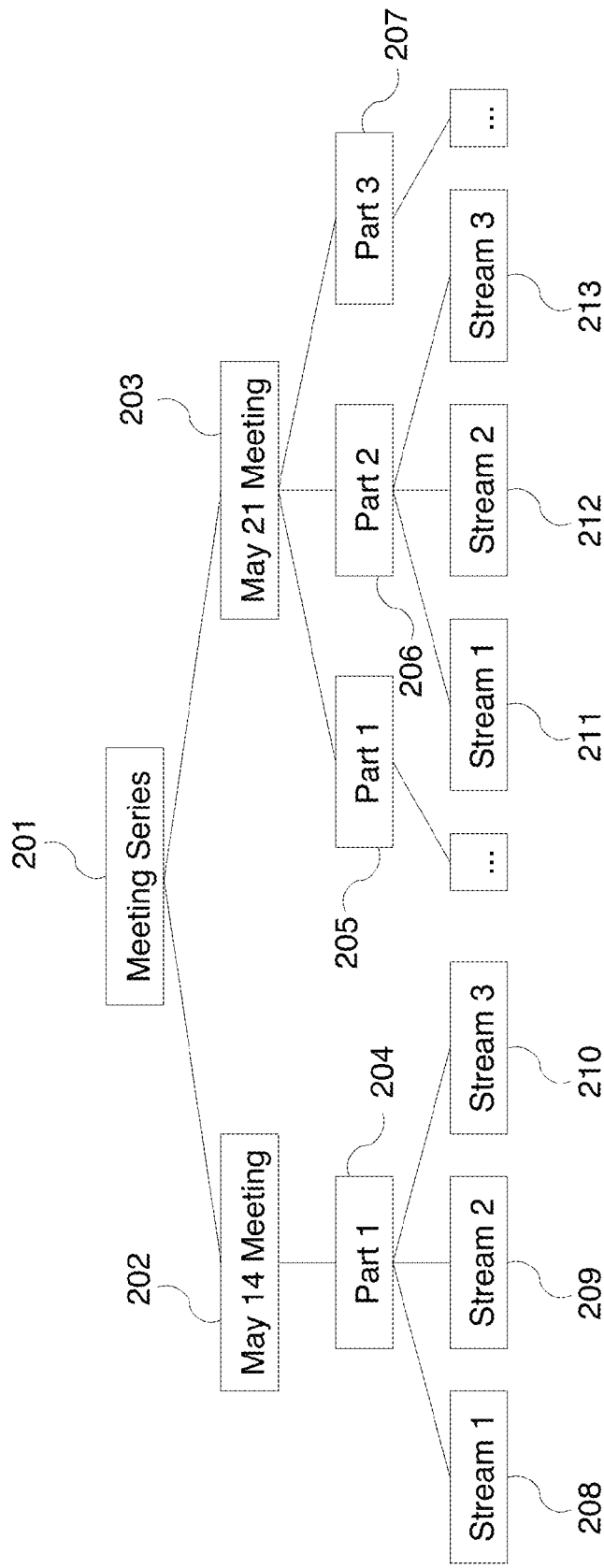

As it is clear from this example, an important aspect of supporting both meeting participants and those who miss meetings is to denote relations among meetings as new meeting content is recorded. To this end, one or more embodiments described herein represent recorded content and metadata describing this content in a number of data structures and tables as shown, for example, in FIGS. 2(a) and 2(b) (note this is not the data structure for the meeting described in FIG. 1). Specifically, FIGS. 2(a) and 2(b) illustrate exemplary embodiments of data structures and tables for representing hypermeetings. In various embodiments, the exemplary data structures shown in FIGS. 2(a) and 2(b) may be stored in a database, such as a relational database well known to persons of ordinary skill in the art, or in any other suitable form, such as in any other data structure, on a computer-readable medium. It should be also noted that the concepts described herein are not limited to any specific data structure used for storing meeting information. Therefore, examples of such structures given herein should not be construed in a limited sense.

With reference to FIG. 2(a), the Meeting Series 201 represents a recurring meeting or a series of interrelated meetings. Each Meeting 202 and 203 in the Meeting Series 201 is itself composed of one or more Meeting Parts 204, 205, 206 and 207, which are the synchronous activities that make up a logical meeting. Each meeting part 204-207 is further composed of one or more respective synchronized video streams 208, 209, 210, 211, 212 and 213 (video takes) and associated additional data. In various embodiments, a meeting part 204-207 may be composed of a single video stream—as would be the case when an individual is recording reactions and/or responses to a previously recorded meeting part that they could not attend.

In various embodiments, metadata associated with elements of the meeting series may include the list of participants who participate in each meeting part 204, 205, 206 and 207, the topics assigned to segments of the corresponding meeting parts, and the links within and between different meeting parts. In various embodiments, meeting parts may be segmented based on the identity of the speaker and/or the topics being discussed. Techniques for such segmentation are well known to persons of ordinary skill in the art. In various embodiments, this segmentation of the meeting parts based on the identity of the speaker and the topics being discussed is used to provide finer access into the meeting recordings. In various embodiments, automatic, semi-automatic, and manual techniques for segmentation, indexing, and linking may be used in connection with the aforesaid meeting parts.

With reference to FIG. 2(b), an embodiment of the described system for automatic generation and consumption of hypermeetings may use a participant table 220, which stores information on the participants of each meeting. This information may be used, for example, for speaker segmentation as described in detail below. In addition, topic table 221 may be provided. This table may include a list of topics, which may be used to index contents of the meetings. Finally, in various embodiments, a link table 222 may be provided, which contains a list of links between contents of the meetings. In various embodiments, each link record contains information on link anchors (start and end time) as well as a link label. The tables 220-222 may be stored in a database, such as a relational database well known to persons of ordinary skill in the art.

Exemplary Meeting Recording Process

Figure 3:
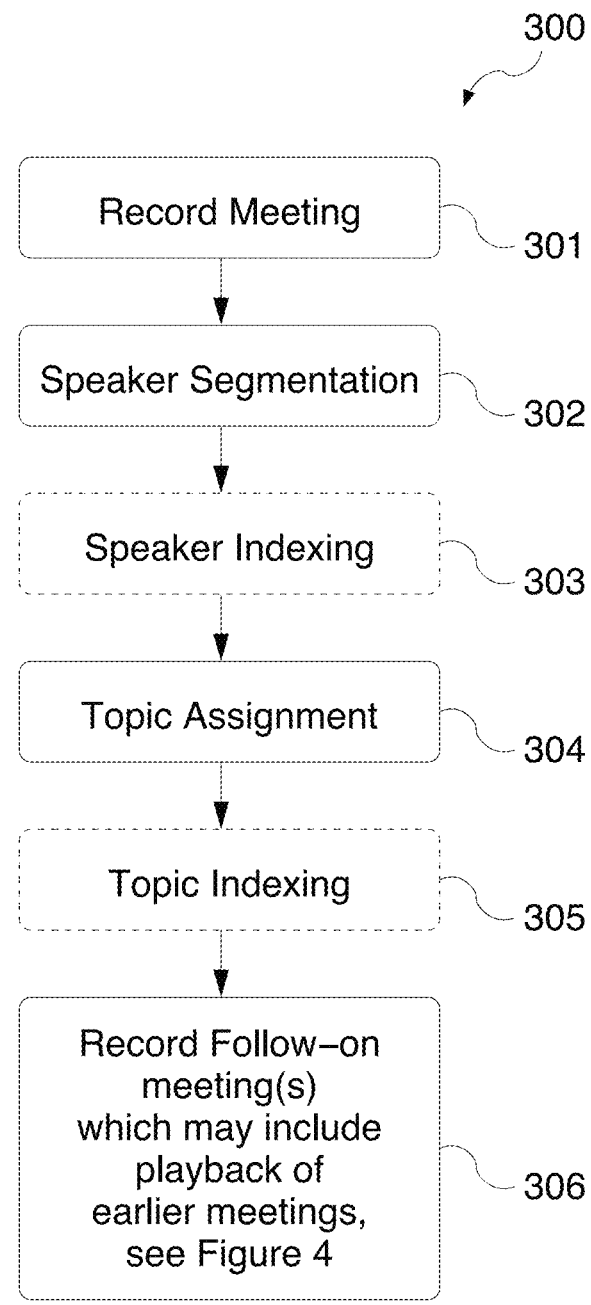
FIG. 3 illustrates an exemplary embodiment of an operating sequence of a process for recording, indexing, and linking of content associated with a meeting.

FIG. 3 illustrates an exemplary embodiment of an operating sequence 300 of a process for recording, indexing, and linking of content associated with a meeting. First, at step 301, a meeting is recorded that consists of one or more synchronized audiovisual streams. In various embodiments, the meeting may be recorded by capturing audio and video using cameras and microphones in a meeting room or by capturing audio and video using cameras and microphones on user's personal devices, such as tables or smartphones. This recorded content is then analyzed using known methods for performing speaker segmentation, see step 302. Thereafter, at step 303, the content may be indexed based on the identified speakers. Specifically, index of start and end times may be created to each speaker at the meeting.

Once the synchronized video content has been segmented based on speaker (and optionally indexed), any assigned topics are attached to segments indicated as overlapping, see step 304. Additionally, indexing of the content based on the assigned topics may be performed in step 305. The resulting segmented video streams and attached metadata (e.g. topics attached to segments) are then used during playback (illustrated in FIG. 4), which results in the creation of follow-on content linked to the previously recorded content, see step 306.

Exemplary Meeting Playback Process

Figure 4:
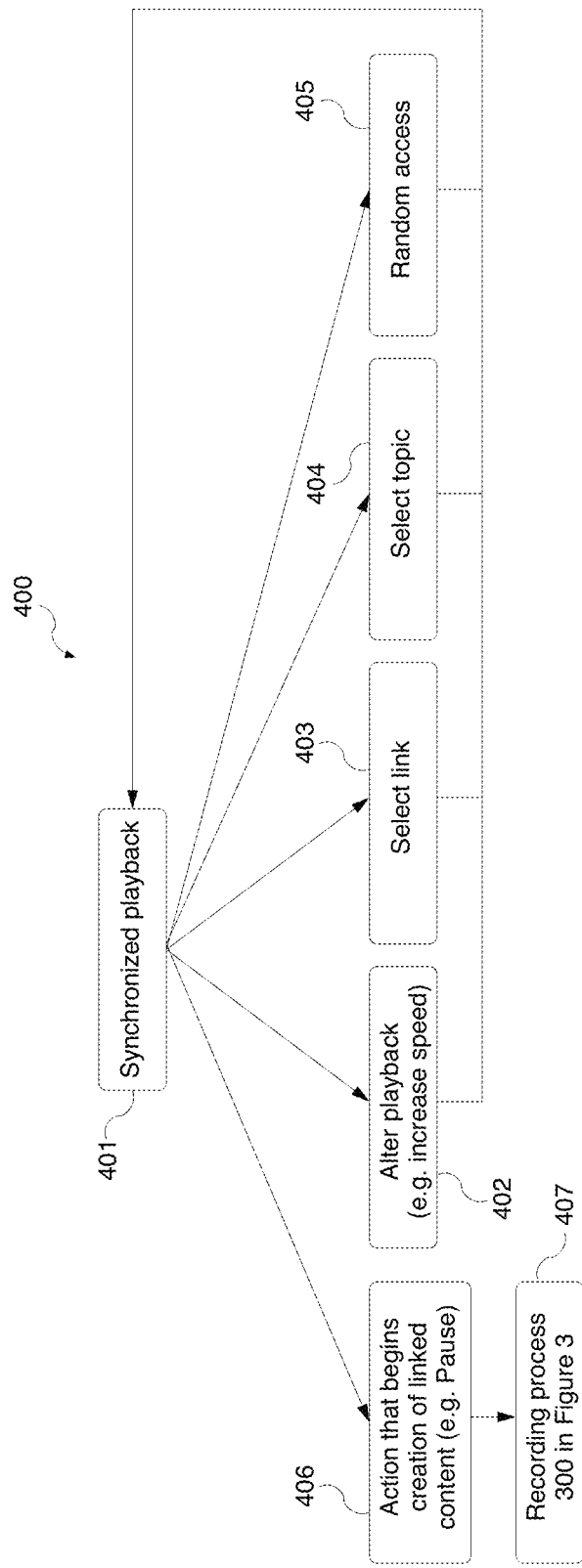
FIG. 4 illustrates an exemplary embodiment of an operating sequence of a process for playback of recorded meetings, which involves the synchronized playback of prior recorded content.

FIG. 4 illustrates an exemplary embodiment of an operating sequence 400 of a process for playback of recorded meetings, which involves the synchronized playback of prior recorded content (using the results generated by the process illustrated in FIG. 3). Because the multiple viewers of the recorded content are distributed geographically yet need to be viewing the same content at the same time (the playback is synchronized), an embodiment of the described system captures and broadcasts any events that alter playback among those watching the recordings. As shown in FIG. 4, during the synchronized playback 401, an embodiment of the described system captures the events 402-405, which include events 402 altering the playback speed (slowing down or speeding up), events 403 selecting a link, events 404 selecting a topic, as well as events 405 selecting a position in the timeline causing the playback for all viewers to synchronously switch to a new position in the same or different set of video recordings. In addition, during the synchronized playback 401, one of the viewers may initiate an action 406 that begins the recording of activity/discussions among the current participants via the process 300 illustrated in FIG. 3, see step 407 in FIG. 4.

In one or more embodiments, the described system for automatic generation and consumption of hypermeetings performs automatic generation and presentation of persistent links between segments of interrelated meeting recordings based on normal meeting viewing and recording behavior of the users. These generated persistent links are stored for subsequent use. First, an exemplary user interface will be described and, subsequently, particular capabilities of the environment will be addressed.

Exemplary User Interface for Meeting Recording and Playback

Figure 5:
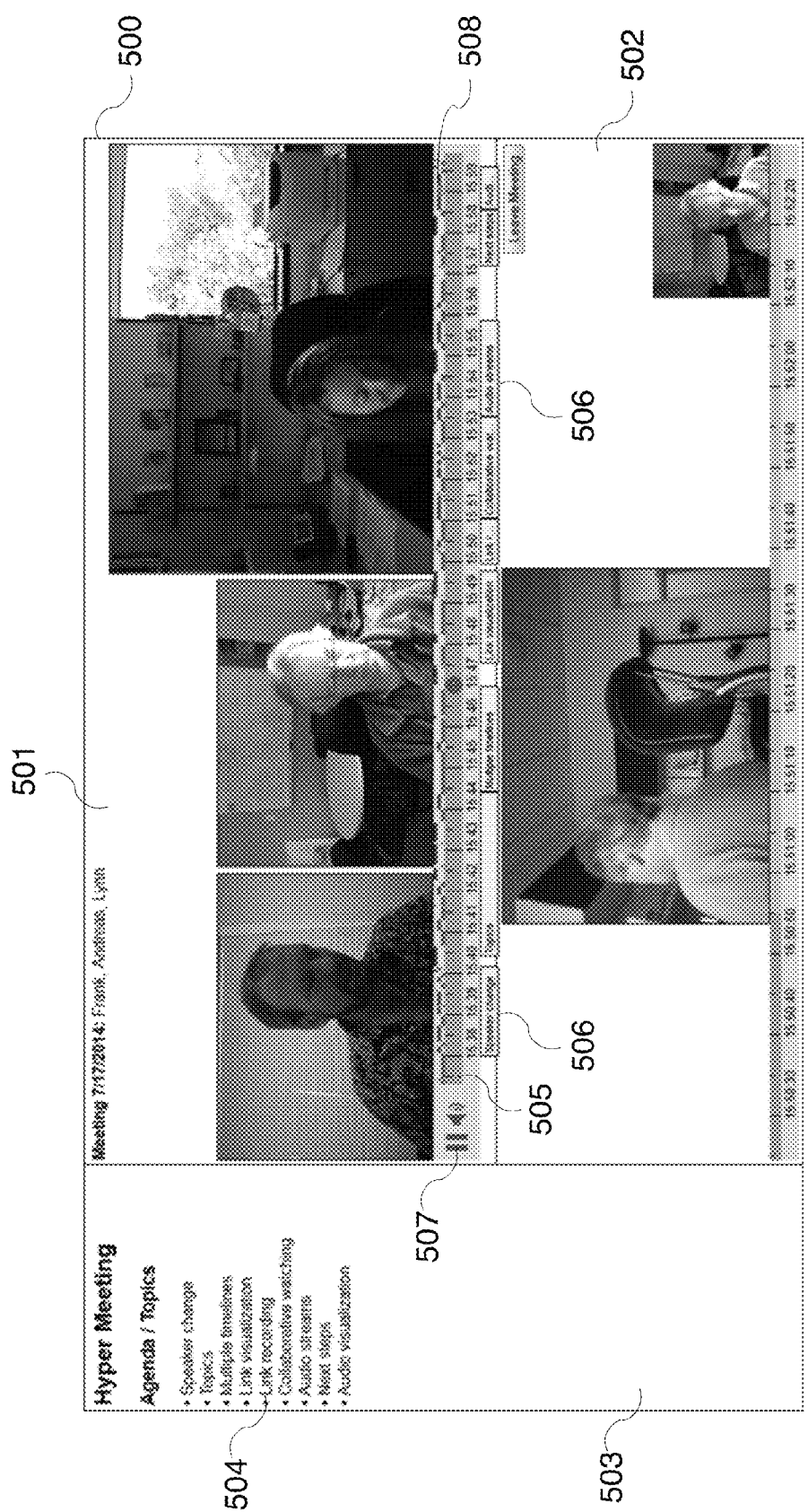
FIG. 5 illustrates an exemplary embodiment of a graphical user interface of the described system for automatic generation and consumption of hypermeetings.

FIG. 5 illustrates an exemplary embodiment of a graphical user interface 500 of the described system for automatic generation and consumption of hypermeetings. Specifically, the graphical user interface 500 shown in FIG. 5 is the main meeting capture and review interface. The top right portion 501 of the interface 500 enables the users to watch and navigate within the video streams associated with the playback of a recorded meeting, which took place sometime in the past. The video streams of the current meeting are displayed in the bottom right portion 502, below those of the recorded past meetings. Video playback of the past meeting(s) is a collaborative activity such that any meeting participant can pause or skip the recorded video streams for all participants. The left portion 503 of the graphical user interface 500 displays the list of topics 504 associated with the captured meeting.

In one or more embodiments, the timeline 505 shows the speaker transitions, for example, by means of color-coding 508. In one ore more embodiments, topic tags 506 may be presented below the timeline 505. In one or more embodiments, alternative visualizations in the timeline 505 are used, including, for example, color coding 508 for topics and image indicators for speaker transitions. User can control playback of the meeting streams using playback control 507.

In one or more embodiments, topics are assigned during the initial recording by meeting participants. In the same or different embodiments, the topics may be also assigned by those watching the videos at a later time. Additionally or alternatively, the topics may be assigned through automated mechanisms that match the elements of predefined agendas based on content processing. Initially, a meeting series may have an extensible set of topics, wherein the graphical user interface provides easy access to those recently defined and used. In addition, meeting participants are enabled by the graphical user interface to add to the initial set of topics, which are stored in data structure(s) associated with the corresponding meeting, such as the topic table 221 shown in FIG. 2(b).

One exemplary setting illustrating an embodiment of the described techniques, involves a later meeting part, with different participants at a different time, watching the previously recorded meeting part. As the participants watch the prior meeting, they pause the prior meeting video stream and begin discussing the same and related topics. In one or more embodiments, upon receipt of the aforesaid pause command, an embodiment of the system automatically generates one or more links between the paused video and the new discussion that is being recorded. In one or more embodiments, the aforesaid generated link is shown as a start in the timeline.

Figure 6:
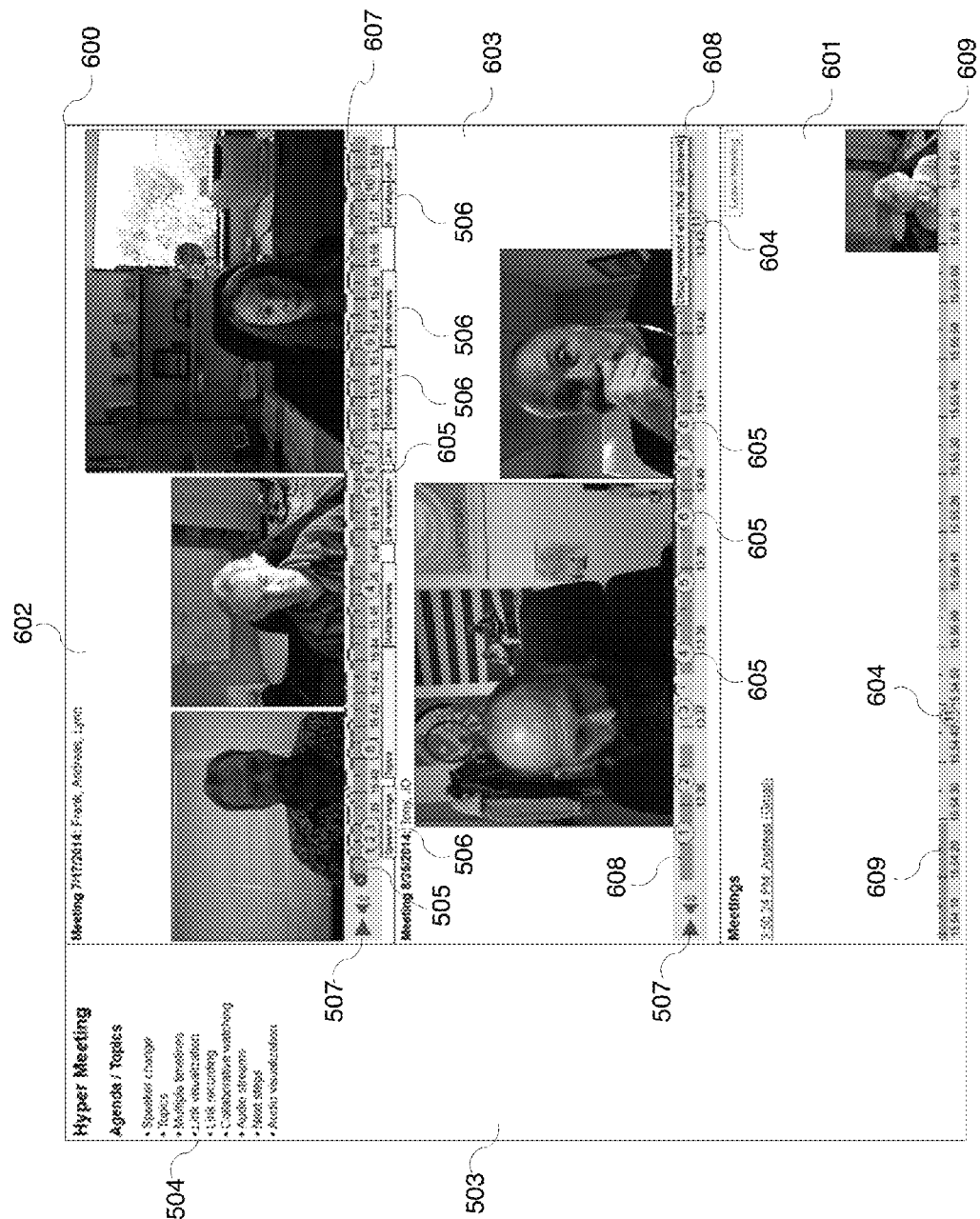
FIG. 6 illustrates an embodiment of a graphical user interface for recording and playback of a meeting in an exemplary situation involving three subsequent meeting parts.

FIG. 6 illustrates an embodiment of a graphical user interface 600 for recording and playback of a meeting in an exemplary situation involving three subsequent meeting parts. The latest meeting part shown in the bottom portion 601 of the user interface 600 represents a sole participant reviewing previous two meeting parts shown in the upper and middle portions 602 and 603, respectively. In the shown embodiment, the link 11 (element 604 in FIG. 6) was recently generated in the third part 601 of a meeting. The older links numbered 1 through 10 (elements 605) point from the first to the second part of the meeting. In one or more embodiments, the system also enables the user to create links for older parts of the meeting to the current part. The vertical position of the circle representing a link (see elements 604 and 605 in FIG. 6) indicates whether it points down to a more recent meeting part or up to an older part. For example, as shown in FIG. 6, links 1-10 on the timeline 505 as well as link 11 on the timeline 608 point down to a more recent meeting part, while links 1-10 on the timeline 608 as well as link 11 on the timeline 609 point up to an older meeting part.

Exemplary Link Following within Meeting

In one or more embodiments, continuous playback of the multipart meeting moves back and forth between the original and additional video content as links are encountered. One way of automatically following links is to start playback in an older part of a meeting. As links to newer meeting parts are encountered, the playback automatically switches to that part of the new meeting. Once the end of the linked video is reached, playback switches back to the link point in the older meeting part. If the linked video contains a link to a more recent meeting part, that link is followed in the same fashion.

In one or more embodiments, links can also be manually followed in both directions. When a link is followed while the original meeting is being watched, the video of the later added comment appears. If the user is watching the comment and clicks on the link, the video of the original meeting is presented. In one or more embodiments, there are multiple ways to determine the starting point for playback in the original meeting when the user follows a link in the later meeting part. The obvious solution is to begin at the point in the original meeting where the link was created. This is likely to be in the middle of a statement, therefore a better option is to start playback at the beginning of the speaker's turn during which the link was created.

Exemplary Timelines Showing Topics, Participants, Links, and Link Labels

In one or more embodiments, the timeline 505 is designed to provide a variety of visualizations to the participants based on the topic and speaker as well as navigational links between or within recordings that have been authored or automatically generated are shown as icons (for example, numbered circles 605 in FIG. 6). For example, discussed topics 606 may be shown below the timeline 505, in the manner illustrated in FIG. 6. In addition, the speakers may be indicated using color-coding 607 over the timeline 505, see FIG. 6.

Finally, links are indicated by numbered circles 605 on the timeline 505. The numbers provide users with information about the destination of the links. As shown in FIG. 6, links shown with numbered circles 605 in the timeline 505 correspond to similarly numbered links in the timeline 608. In one or more embodiments, additional information regarding the links may appear when the mouse cursor lingers over the corresponding icon.

Speaker Segmentation with Multiple Microphones

In one or more embodiments, for the user interface, it is useful to display a timeline showing when each of the participants is speaking. This allows the viewer to skip to comments made by a particular person. In one embodiment, we currently assume that each speaker has a microphone speaker set up that assures that the audio from the meeting playback or co-located speaker is not picked up by the microphone. This can be achieved by using a close talking or directional microphone and placing speakers out of the microphone range, or by using earphones. Thus the task of segmenting the audio based on speaker is reduced to determining when each speaker is talking as opposed to when they are silent. In other embodiments speaker segmentation can be performed automatically based on trained or untrained speaker models using well-known techniques. In one or more embodiments, a simple signal energy threshold may be used with a delay to eliminate short noise artifacts.

Topic Segmentation

In various embodiments, topic segmentation may be also reflected in the timeline 505, as shown, for example, by numerals 606 in FIG. 6. In various embodiments, topic segmentation may be performed manually or automatically, using any appropriate techniques known to persons of ordinary skill in the art.

Exemplary Computer Platform

Figure 7:
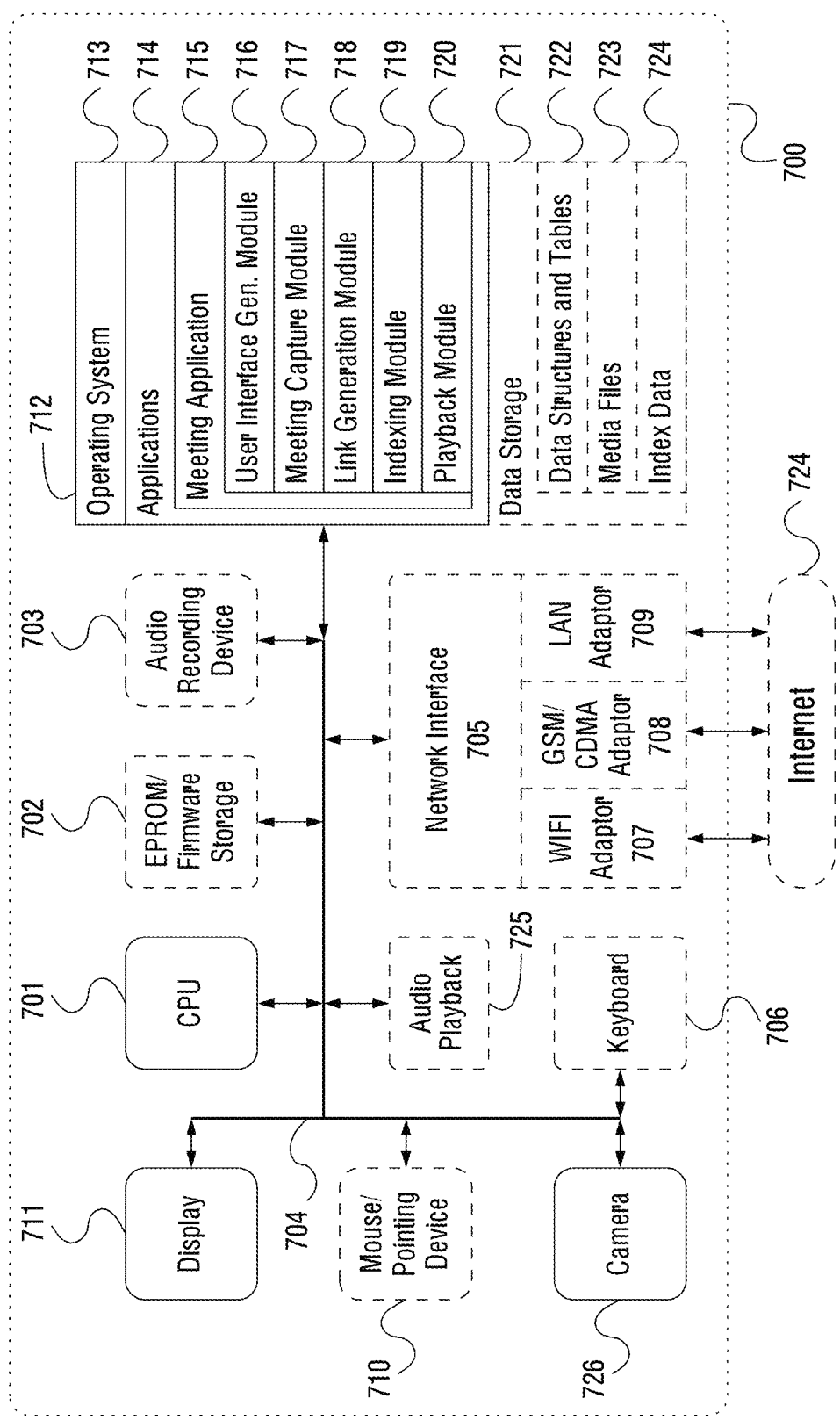
FIG. 7 illustrates an exemplary embodiment of a computerized system for automatic generation and consumption of hypermeetings.

FIG. 7 illustrates an exemplary embodiment of a computerized system 700 for automatic generation and consumption of hypermeetings. In one or more embodiments, the computerized system 700 may be implemented within the form factor of a desktop computer well known to persons of skill in the art. In an alternative embodiment, the computerized system 700 may be implemented based on a laptop or a notebook computer or any other mobile computing device, such as a smartphone or a tablet computer.

The computerized system 700 may include a data bus 704 or other interconnect or communication mechanism for communicating information across and among various hardware components of the computerized system 700, and a central processing unit (CPU or simply processor) 701 electrically coupled with the data bus 704 for processing information and performing other computational and control tasks. Computerized system 700 also includes a memory 712, such as a random access memory (RAM) or other dynamic storage device, coupled to the data bus 704 for storing various information as well as instructions to be executed by the processor 701. The memory 712 may also include persistent storage devices, such as a magnetic disk, optical disk, solid-state flash memory device or other non-volatile solid-state storage devices.

In one or more embodiments, the memory 712 may also be used for storing temporary variables or other intermediate information during execution of instructions by the processor 701. Optionally, computerized system 700 may further include a read only memory (ROM or EPROM) 702 or other static storage device coupled to the data bus 704 for storing static information and instructions for the processor 701, such as firmware necessary for the operation of the computerized system 700, basic input-output system (BIOS), as well as various configuration parameters of the computerized system 700.

In one or more embodiments, the computerized system 700 may incorporate a display device 711, which may be also electrically coupled to the data bus 704, for displaying various information to a user of the computerized system 700, such as the user interfaces showing meetings parts described herein. In an alternative embodiment, the display device 711 may be associated with a graphics controller and/or graphics processor (not shown). The display device 711 may be implemented as a liquid crystal display (LCD), manufactured, for example, using a thin-film transistor (TFT) technology or an organic light emitting diode (OLED) technology, both of which are well known to persons of ordinary skill in the art. In various embodiments, the display device 711 may be incorporated into the same general enclosure with the remaining components of the computerized system 700. In an alternative embodiment, the display device 711 may be positioned outside of such enclosure, such as on the surface of a table or a desk. In one or more embodiments, the computerized system 700 may further incorporate an audio capture device 703, such as a microphone, configured to capture the audio component(s) of a meeting and store the recorded audio information in the memory 712.

In one or more embodiments, the computerized system 700 may further incorporate an audio playback device 725 electrically connected to the data bus 704 and configured to play various audio files, such as MPEG-3 files, or audio tracks of various video files, such as MPEG-4 files, which may be the audio components of the recorded meetings, as it is well known to persons of ordinary skill in the art. To this end, the computerized system 700 may also incorporate waive or sound processor or a similar device (not shown).

In one or more embodiments, the computerized system 700 may incorporate one or more input devices, such as a mouse/pointing device 710, such as a mouse, a trackball, a touchpad, or cursor direction keys for communicating direction information and command selections to the processor 701 and for controlling cursor movement on the display 711. This input device typically has two degrees of freedom in two axes, a first axis (e.g., x) and a second axis (e.g., y), that allows the device to specify positions in a plane.

The computerized system 700 may further incorporate a camera 726 for acquiring still images and video of various objects, including the video of the meetings described herein, as well as a keyboard 706, which all may be coupled to the data bus 704 for communicating information, including, without limitation, images and video, as well as user commands (including gestures) to the processor 701.

In one or more embodiments, the computerized system 700 may additionally include a communication interface, such as a network interface 705 coupled to the data bus 704. The network interface 705 may be configured to establish a connection between the computerized system 700 and the Internet 724 using at least one of a WIFI interface 707, a cellular network (GSM or CDMA) adaptor 708 and/or local area network (LAN) adaptor 709. The network interface 705 may be configured to enable a two-way data communication between the computerized system 700 and the Internet 724. The WIFI adaptor 707 may operate in compliance with 802.11a, 802.11b, 802.11g and/or 802.11n protocols as well as Bluetooth protocol well known to persons of ordinary skill in the art. The LAN adaptor 709 of the computerized system 700 may be implemented, for example, using an integrated services digital network (ISDN) card or a modem to provide a data communication connection to a corresponding type of telephone line, which is interfaced with the Internet 724 using Internet service provider's hardware (not shown). As another example, the LAN adaptor 709 may be a local area network interface card (LAN NIC) to provide a data communication connection to a compatible LAN and the Internet 724. In an exemplary implementation, the WIFI adaptor 707, the cellular network (GSM or CDMA) adaptor 708 and/or the LAN adaptor 709 send and receive electrical or electromagnetic signals that carry digital data streams representing various types of information.

In one or more embodiments, the Internet 724 typically provides data communication through one or more sub-networks to other network resources. Thus, the computerized system 700 is capable of accessing a variety of network resources located anywhere on the Internet 724, such as remote media servers, web servers, other content servers as well as other network data storage resources. In one or more embodiments, the computerized system 700 is configured to send and receive messages, media and other data, including application program code, through a variety of network(s) including the Internet 724 by means of the network interface 705. In the Internet example, when the computerized system 700 acts as a network client, it may request code or data for an application program executing on the computerized system 700. Similarly, it may send various data or computer code to other network resources.

In one or more embodiments, the functionality described herein is implemented by computerized system 700 in response to processor 701 executing one or more sequences of one or more instructions contained in the memory 712. Such instructions may be read into the memory 712 from another computer-readable medium. Execution of the sequences of instructions contained in the memory 712 causes the processor 701 to perform the various process steps described herein. In alternative embodiments, hard-wired circuitry may be used in place of or in combination with software instructions to implement the embodiments of the invention. Thus, the described embodiments of the invention are not limited to any specific combination of hardware circuitry and/or software.

The term "computer-readable medium" as used herein refers to any medium that participates in providing instructions to the processor 701 for execution. The computer-readable medium is just one example of a machine-readable medium, which may carry instructions for implementing any of the methods and/or techniques described herein. Such a medium may take many forms, including but not limited to, non-volatile media and volatile media.

Common forms of non-transitory computer-readable media include, for example, a floppy disk, a flexible disk, hard disk, magnetic tape, or any other magnetic medium, a CD-ROM, any other optical medium, punchcards, paper-tape, any other physical medium with patterns of holes, a RAM, a PROM, an EPROM, a FLASH-EPROM, a flash drive, a memory card, any other memory chip or cartridge, or any other medium from which a computer can read. Various forms of computer readable media may be involved in carrying one or more sequences of one or more instructions to the processor 701 for execution. For example, the instructions may initially be carried on a magnetic disk from a remote computer. Alternatively, a remote computer can load the instructions into its dynamic memory and send the instructions over the Internet 724. Specifically, the computer instructions may be downloaded into the memory 712 of the computerized system 700 from the foresaid remote computer via the Internet 724 using a variety of network data communication protocols well known in the art.

In one or more embodiments, the memory 712 of the computerized system 700 may store any of the following software programs, applications or modules:

1. Operating system (OS) 713 for implementing basic system services and managing various hardware components of the computerized system 700. Exemplary embodiments of the operating system 713 are well known to persons of skill in the art, and may include any now known or later developed mobile operating systems.

2. Applications 714 may include, for example, a set of software applications executed by the processor 701 of the computerized system 700, which cause the computerized system 700 to perform certain predetermined functions, such as display the graphical user interface(s) on the display device 711 or record video of a meeting using the camera 726. In one or more embodiments, the applications 714 may include an inventive application 715 for automatic generation and consumption of hypermeetings, described in detail below.

3. Data storage 721 may store, for example, the data structures and tables 722 for storing various information associated with hypermeetings, as illustrated, for example, in FIGS. 2(*a*) and 2(*b*). In addition, the data storage 721 may include media files 723 of the actual recorded media streams corresponding to the meetings as described herein.

In one or more embodiments, the inventive meeting application 715 for automatic generation and consumption of hypermeetings incorporates a user interface generation module 716 configured to generate one or more user interfaces illustrated, for example, in FIGS. 5 and 6. In addition, there may be provided a meeting capture module 717 for capturing video and audio stream(s) of meetings using the audio capture device 703 and the camera 726. Yet additionally, there may be provided a link generation module 718 for automatically generating links between meeting parts as described above and storing the generated links in the data storage portion 722. Additionally provided may be an indexing module 719 for indexing speaker and topic information, see steps 303 and 305 in FIG. 3. Finally, playback module 720 may be provided to facilitate the synchronous playback of the prior meetings, as shown, for example in FIG. 4.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, Objective-C, perl, shell, PHP, Java, as well as any now known or later developed programming or scripting language.

Moreover, other implementations of the invention will be apparent to those skilled in the art from consideration of the specification and practice of the invention disclosed herein. Various aspects and/or components of the described embodiments may be used singly or in any combination in the systems and methods for automatic generation and consumption of hypermeetings. It is intended that the specification and examples be considered as exemplary only, with a true scope and spirit of the invention being indicated by the following claims.

What is claimed is:

1. A computer-implemented method for a meeting playback, the method being performed in connection with a computerized system comprising a central processing unit, a display device and a memory, the computer-implemented method comprising:
   a. generating a first user interface portion on the display device for displaying a first meeting;
   b. generating a second user interface portion on the display device for displaying a second meeting, wherein the first meeting is prior to the second meeting and wherein the first meeting and second meeting are linked together using at least one link;
   c. performing a playback of the second meeting in the second user interface portion generated on the display device; and
   d. during the playback of the second meeting, using the at least one link to perform a playback of at least a portion of the first meeting in the first user interface portion generated on the display device.

2. The computer-implemented method of claim 1, wherein the first meeting and the second meeting each comprise a plurality of audiovisual streams and wherein performing the playback of the first meeting or the second meeting comprises performing the playback of a corresponding audiovisual stream of the plurality of audiovisual streams.

3. The computer-implemented method of claim 1, further comprising performing a playback of the first meeting in the first user interface and, during the playback of the first meeting, using the at least one link to perform a playback of at least a portion of the second meeting.

4. The computer-implemented method of claim 1, wherein in d. the at least one link is automatically followed.

5. The computer-implemented method of claim 1, wherein the first user interface portion comprises a first timeline and the second user interface portion comprises a second timeline and wherein the at least one link is indicated on the first timeline and on the second timeline.

6. The computer-implemented method of claim 1, wherein the first user interface portion comprises a first timeline and wherein an identity of at least one speaker associated with the first meeting is indicated on the first timeline.

7. The computer-implemented method of claim 1, wherein the second user interface portion comprises a second timeline and wherein an identity of at least one speaker associated with the second meeting is indicated on the second timeline.

8. The computer-implemented method of claim 1, wherein the first user interface portion comprises a first timeline and wherein at least one topic associated with the first meeting is indicated on the first timeline.

9. The computer-implemented method of claim 1, further comprising generating a third user interface portion on the display device, the third user interface portion displaying at least one topic associated with the first meeting.

10. The computer-implemented method of claim 1, further comprising receiving a command associated with the playback of the second meeting and propagating the received command to a second computerized system performing a playback of the second meeting such that the playback of the second meeting on the computerized system and the second computerized system are synchronized.

11. The computer-implemented method of claim 10, wherein the received command is a playback pause command.

12. The computer-implemented method of claim 1, wherein the least one link comprises a start time, an end time and a link label.

13. The computer-implemented method of claim 1, further comprising, upon a receipt of a command, automatically creating a second link between the second meeting and the first meeting.

14. The computer-implemented method of claim 13, wherein the command is a playback pause command.

15. A computer-implemented method for capturing a first meeting and a second meeting, the method being performed in connection with a computerized system comprising a central processing unit, a camera, an audio capture device and a memory, the computer-implemented method comprising:
   a. capturing at least one first media stream corresponding to the first meeting involving at least one first participant;
   b. capturing at least one second media stream corresponding to the second meeting involving at least one second participant, wherein the second meeting takes place later in time than the first meeting; and
   c. during the recording of the second media stream, performing a playback of at least a portion of the first media stream, wherein the first meeting and second meeting are linked together using at least one link and wherein the playback of at least a portion of the first media stream is performed using the at least one link.

16. The computer-implemented method of claim 15, further comprising, upon a receipt of a command, automatically creating the link between the second meeting and the first meeting.

17. The computer-implemented method of claim 16, wherein the command is a playback pause command.

18. The computer-implemented method of claim 15, further comprising performing speaker segmentation within the captured first media stream and the second media stream.

19. The computer-implemented method of claim 15, further comprising assigning a plurality of topics to a plurality of portions of the captured first media stream.

20. The computer-implemented method of claim 19, further comprising indexing the assigned plurality of topics.

21. The computer-implemented method of claim 15, further comprising performing topic assignment within the captured first media stream and the second media stream.

22. The computer-implemented method of claim 15, further comprising capturing at least one third media stream corresponding to a third meeting involving the playback of at least a portion of the first or second media stream.

23. A non-transitory computer-readable medium embodying a set of computer-executable instructions, which, when executed in a computerized system comprising a central processing unit, a display device and a memory, cause the computerized system to perform a method for a meeting playback, the method comprising:
   a. generating a first user interface portion on the display device for displaying a first meeting;
   b. generating a second user interface portion on the display device for displaying a second meeting, wherein the first meeting is prior to the second meeting and wherein the first meeting and second meeting are linked together using at least one link;
   c. performing a playback of the second meeting in the second user interface portion generated on the display device; and
   d. during the playback of the second meeting, using the at least one link to perform a playback of at least a portion of the first meeting in the first user interface portion generated on the display device.

* * * * *